UNITED STATES PATENT OFFICE.

ALEXANDER McLEAN, OF TORONTO, ONTARIO, CANADA, ASSIGNOR OF TWO-THIRDS HIS RIGHT TO I. W. G. WHITNEY AND BENJAMIN MORTON, OF SAME PLACE.

IMPROVEMENT IN STONE PRESERVATIVE AND RENOVATING COMPOUNDS.

Specification forming part of Letters Patent No. 201,032, dated March 5, 1878; application filed January 7, 1878.

*To all whom it may concern:*

Be it known that I, ALEXANDER MCLEAN, of the city of Toronto, in the county of York, in the Province of Ontario, Canada, have invented a new and useful Compound for Preserving and Renovating the Face of Stone-Work, which compound is fully described in the following specification.

My invention has relation to a compound which, when applied as a wash or paint on the face of new stone-work, will act as a preservative from the action of the weather, and when applied to the face of weather-stained stone-work will renovate, preserve, and give it the appearance of new work.

The compound consists of three (3) parts, more or less, of Portland or other equivalent cement; one (1) part, more or less, of gray lime or its equivalent; two (2) parts, more or less, of hydraulic cement or its equivalent; and one-half ($\frac{1}{2}$) part, more or less, of plaster-of-paris or its equivalent, ground together, after being run through a fine sieve and well mixed in a liquid composed of the following materials in the following proportions: One gallon of water, one-half ($\frac{1}{2}$) pint of spirits of salt or sulphuric acid or their equivalent, and one-quarter ($\frac{1}{4}$) pint of hydrochloric acid or its equivalent.

The wash, when applied, should be of the consistency of thin paint, and should be made in small quantities at a time.

Although the proportions given above for the materials, in my opinion, produce the best results, I do not confine myself to the exact ratio of parts there enumerated, as they may be modified without departing from the spirit of my invention. Equivalent materials may also be substituted for some of the parts without departing from my invention, as it is well known in the arts and trades that qualities similar to those required exist in different substances. In order, therefore, that no misunderstanding may exist, the following description of the qualities for which the several ingredients are used is given.

The Portland cement gives durability, color, and quick setting to the compound, and prevents dampness entering the stone. The gray lime and plaster-of-paris give body and color. The hydraulic cement gives quick setting and color, and the sulphuric and hydrochloric acids clean the face of the stone and assist in the coloring and permanent setting of the wash. The water is the medium by which the ingredients are thoroughly incorporated into a wash having a uniform consistency, and is also the medium by which the compound is applied in a proper manner to the face of the stone.

The color of the wash is varied by using cements of varying color, but possessing similar qualities.

The qualities possessed by this compound render stone-work, when coated with it, impervious to dampness, and therefore more durable; and, in addition, in the case of old or discolored work, give a fresh, clean face, greatly resembling newly-cut stone.

The wash may be used with great advantage to cover brick-work, plaster, wood, or any building material, when an imitation of stone-work is desired.

I claim as my invention—

The within-described compound, consisting of Portland cement, gray lime, hydraulic cement, and plaster-of-paris, in combination with a solution composed of water, sulphuric acid, and hydrocholoric acid, mixed and applied substantially in the manner and for the purpose specified.

A. McLEAN.

Witnesses:
 GEO. A. AIRD,
 L. WHITEHEAD.